E. G. THOMAS.
LOCKING DEVICE FOR WEIGHING SCALES.
APPLICATION FILED OCT. 13, 1917.

1,386,662.

Patented Aug. 9, 1921.
2 SHEETS—SHEET 1.

Inventor
Edward G. Thomas

Witnesses
M. A. Weckerly.

By George R. Frye,
Attorney

E. G. THOMAS.
LOCKING DEVICE FOR WEIGHING SCALES.
APPLICATION FILED OCT. 13, 1917.
1,386,662.
Patented Aug. 9, 1921.
2 SHEETS—SHEET 2.
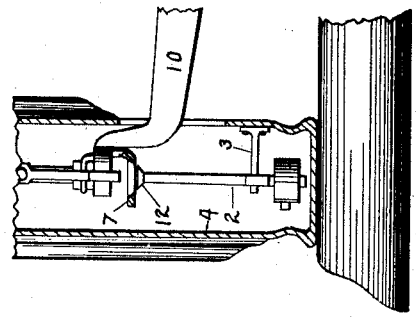
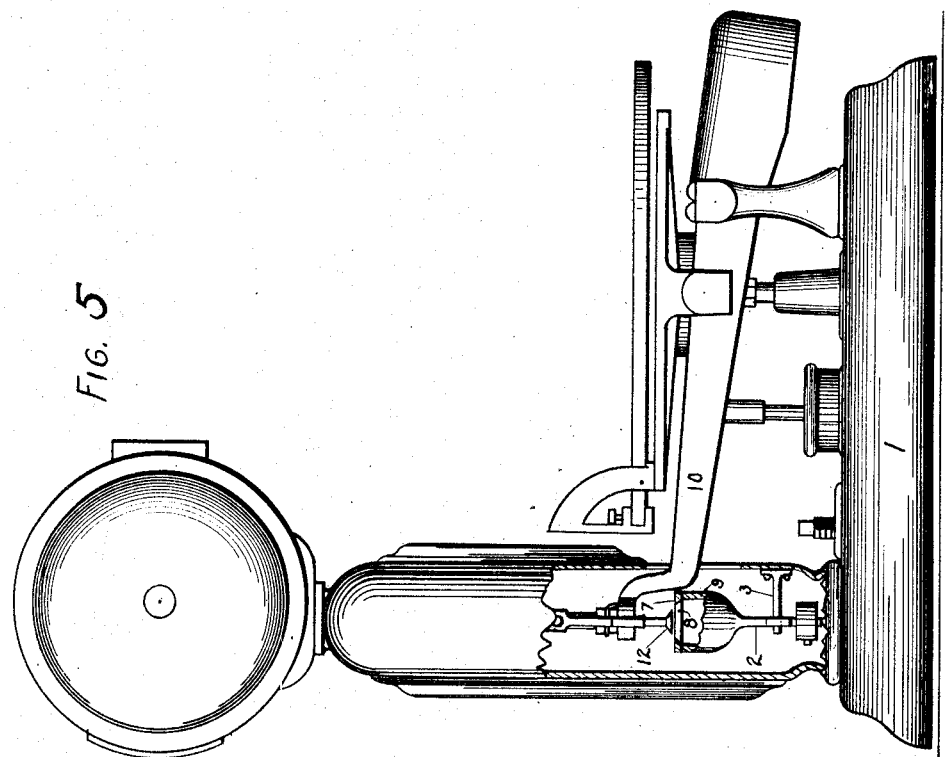
Inventor
Edward G. Thomas.

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

LOCKING DEVICE FOR WEIGHING-SCALES.

1,386,662.        Specification of Letters Patent.        Patented Aug. 9, 1921.

Application filed October 13, 1917. Serial No. 196,515.

*To all whom it may concern:*

Be it known that I, EDWARD G. THOMAS, a citizen of the United States, residing at Toledo, in the county of Lucas and State of Ohio, have invented certain new and useful Improvements in Locking Devices for Weighing-Scales, of which the following is a specification.

This invention relates to devices for indicating whether or not a weighing scale is in a level position or beyond a certain degree out of level position in order that there will be pointed out the need for its adjustment should it be beyond an allowable degree out of level.

The majority of States and towns have ordinances and regulations providing for the degree of accuracy of weighing scales which may be used in the territory covered by such laws and providing for penalties for the use of scales which do not weigh within the tolerances which the regulations provide, the enforcement of these laws being given to a body of inspectors whose duty it is to examine the scales and note whether they act within the prescribed standard. In order not to incur the financial penalties which will arise from the use of inaccurate scales, as well as to give honest weight in their transactions, the users of scales must use all possible precautions to insure the accuracy of their weighing devices. The makers of scales on their part are prepared to furnish to the general public scales which will weigh within very narrow limits of accuracy, but it is requisite that the scales while in use shall be maintained in the position for which they were originally adjusted. Since, however, the position of the scale depends upon the solidity of the counter or table upon which it is placed, it is obvious that the scale may be accidentally thrown out of level by the warping or other change in shape of its support, or by the temporary bending of the counter or table through the depositing upon it of heavy weights of material.

The purpose of my invention is to furnish an indication of an out-of-level position which shall forcibly attract the eye and be located in a prominent position, thus effectively notifying the user of the scale that the scale is not in condition for accurate weighing. Provision may also be made for displaying the indicator to the customer as well as to the user to permit a check on any dealer who might desire to use the scale when not in position for honest weighings.

With the above objects in view, which will readily appear from the following description, my invention consists of the novel construction, combination and arrangement of parts more fully described in the following specification and set forth in the subjoined claims.

Referring to the drawings, which portray an illustrative form of my invention and wherein similar reference numerals designate similar parts throughout the several views:—

Fig. 5 is a side view of the scale illustrated in Fig. 1; and

Fig. 6 is a side view in partial section of a modified form of the apparatus.

Figure 1:
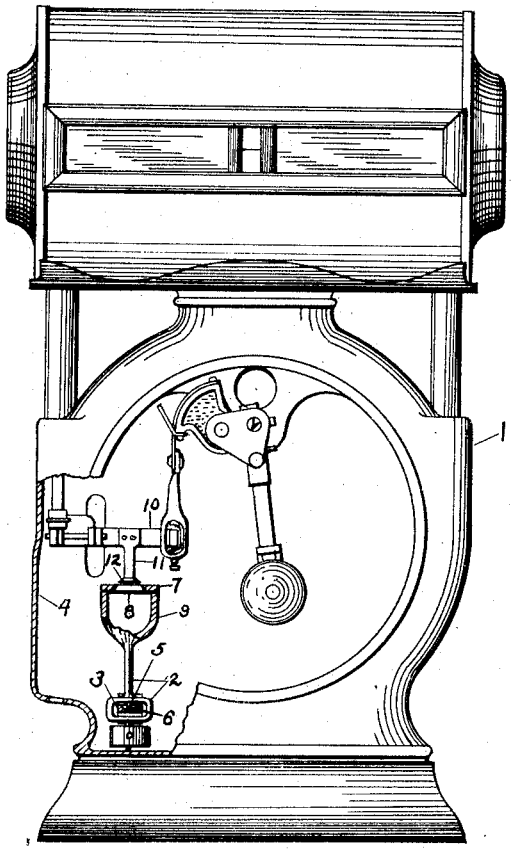
Figure 1 is a front elevation of a well-known type of scale in which a portion of the casing has been broken away to show parts embodying my invention.

Referring to the drawings, 1 designates a typical counter weighing scale, and as herein shown employs a pendulum as its weight-offsetting device. A weighted member 2 is pivotally supported so as to be capable of free movement in all vertical planes on a bracket 3 attached to the casing 4 of the scale. In order to readily secure the pivotal action desired the weighted member 2 is provided with a conical pivot 5 which rests in a depression 6 in bracket 3. A plate 7 having a circular opening 8 therein is secured to the weighted member at a relatively long distance above its point of support compared with the distance of the center of gravity of the weighted portion of this member below the point of support, the attachment of the plate to this weighted member being by means of a cylindrical cup having an internal diameter somewhat greater than the diameter of the opening 8. Attached to the scale beam 10 of the scale 1 is a depending member 11 having at its lower end a circular plate 12 smaller in diameter than the opening 8. The relative location of parts just described is such that when the scale is absolutely level the center of plate 12 coincides with the center of opening 8 in plate 7 so that plate 12 will freely move up and down through opening 8 as the scale beam is loaded or unloaded, and will not touch plate 7 at any point. At this time the scale, being in a proper position, will be free for use and will register accurate weights if otherwise suitably adjusted.

Figure 2:
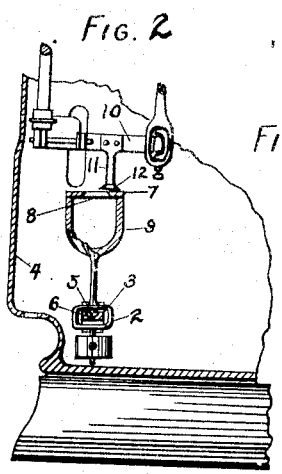
Fig. 2 is a detail view of that portion of the casing which contains my device, illustrating the relative position of the apparatus when the scale has been tipped.

When any change in the position of the scale occurs plate 12 will be moved from its previous position in the center of opening 8 since opening 8 will remain in the same position as before because of the plumb-bob-like character of the weighted member 2, and should the change of position of the scale 1 be sufficiently great, the edge of plate 12 will be moved over the edge of opening 8. In this position plate 7 will prevent plate 12 from moving downward, as illustrated in Fig. 2, and the scale will thus be so locked that it cannot be used at all for a weighing operation. By releveling the scale, plate 12 will be restored to its position over the center of opening 8 and the scale will then be free for use, as desired.

Figure 4:
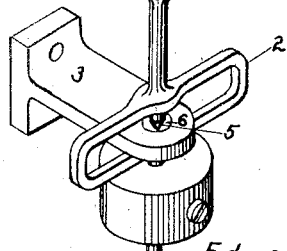
Fig. 4 is a perspective view of a portion of the apparatus which has been modified to permit the scale to be tipped at a greater angle in one direction than at right angles thereto before the apparatus locks the scale.
Figure 3:
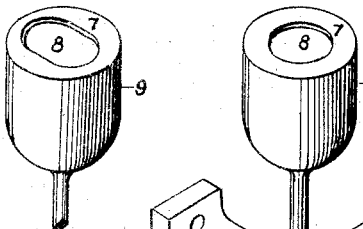
Fig. 3 is a perspective view of parts of the apparatus entering into the construction shown in Figs. 1 and 2 but on a larger scale.

Inasmuch as a slight change of level in the position of the scale may not result in an error in its weighing sufficiently great to cause it to exceed the tolerance permitted, the opening 8 in plate 7 is made slightly larger in diameter than is plate 12, so that the engagement of plate 12 with the side of opening 8 will occur only after a change of level sufficient to cause the error in weighing due to it to approach or exceed the permitted tolerance. A change of level in one direction may not cause the same error in the weighing as will a change of level of the same amount in a direction at right angles to the first, and in general with pendulum scales a change of level in the plane in which the pendulum swings will cause a greater error than the same change of level at right angles thereto. For this reason it is desirable to permit a greater relative motion between plate 12 and opening 8 before they can become engaged by the vertical motion of the scale beam to occur in a direction at right angles to the plane in which the pendulum of the scale swings than in a direction at right angles thereto. This can be accomplished readily by making the opening 8 in plate 7 elliptical in shape with its shortest dimension parallel to the plane of the pendulum's swing, as illustrated in Fig. 4, or plate 12 may be made elliptical in the opposite direction.

An alternative form of construction is illustrated in Fig. 6, where the relative position of the engaging plate 12 and annular engaging plate 7 is reversed, the former being attached to the weighted member 2 and the latter to the scale beam 10 of the scale 1. The action of the device will be identical, however, with the construction already described.

While it will be apparent that the illustrated embodiments of my invention herein disclosed are well calculated to adequately fulfil the objects primarily stated, it is to be understood that my invention is susceptible to variation, modification and change without departing from the spirit and scope of the invention as set forth in the subjoined claims.

Having described my invention, I claim:

1. The combination with a scale having movable operating parts, of a device arranged adjacent said parts and adapted to engage therewith to restrain said parts against movement when the scale is out of level.

2. In a weighing scale, the combination of a platform, means for determining the weight of an article placed on the platform, and means adapted to engage and restrain the action of the weight-determining means when the scale is out of level.

3. In a weighing scale, the combination of a platform, means for offsetting the weight of an article placed on the platform, and locking means adapted to engage and restrain the action of the weight-offsetting means when the scale is out of level.

4. In a weighing scale, a platform, a lever connected with the platform and adapted to move when a weight is placed upon the platform, and means adapted to engage and restrain the movement of said lever when the scale is out of level.

5. The combination with a weighing scale, of a weighted member pivotally supported by the frame of said scale to stand normally vertical and adapted to engage and prevent motion of the operative parts of the scale upon a change from the relative normal position of the scale frame and said member.

6. The combination with a weighing scale having a frame, of a weighted member pivotally supported thereon to stand normally vertical, and locking means attached to said weighted member and adapted to engage and prevent motion of the operative parts of said scale when said scale frame is moved from a level position more than a predetermined amount.

7. The combination with a weighing scale having a frame, of a weighted member pivotally supported by said scale frame to stand normally vertical, and male and female inter-changing locking members, one attached to said weighing scale and the other to said weighted member.

8. The combination with a weighing scale having a frame, of a weighted member pivotally supported by said frame to stand normally vertical, male and female locking members, one attached to said weighing scale and the other attached to said weighted member, and arranged to engage one another upon a deviation from level of said scale frame.

9. The combination with a weighing scale having a frame, of a weighted member pivotally supported by said frame to stand normally vertical, male and female locking members, one attached to said weighing scale and the other attached to said weighted member, and arranged to engage one another upon a deviation from level of said scale frame of more than a predetermined amount.

10. The combination with a weighing scale having a frame, of a weighted member mounted upon the frame so as to swing freely in all vertical planes, male and female locking members, one attached to said weighing scale and the other to said weighted member, and arranged to engage one another upon a deviation from level of said scale of an amount greater in one direction than in a direction at right angles thereto.

11. In a weighing scale having a frame, a platform, operative parts arranged to be moved when a commodity is placed upon the platform, and locking means pivotally mounted upon said frame for restraining the movement of said operative parts when the scale is out of level beyond a predetermined degree.

12. In a weighing scale having a frame, a platform, operative parts arranged to be moved when a commodity is placed upon the platform, and locking means pivotally mounted upon said frame for restraining the movement of said operative parts when the scale is out of level beyond a predetermined degree, said locking means comprising a member extending into proximity to the operating parts and adapted to engage therewith.

13. In a locking device, a frame, a machine part movable in a definite path with respect to said frame, a locking member for said part supported by said frame, and gravity-controlled means for moving said member into locking position or unlocking position as said frame is tilted.

14. In a locking device, a frame, a locking member connected to said frame for reciprocatory movement, a locking member connected to said frame for universal movement transverse to the movement of the first said locking member, and gravity-controlled means for bringing said members into locking or unlocking position as said frame is tilted.

EDWARD G. THOMAS.

Witnesses:
F. A. CROWLEY,
GEORGE R. FRYE.